US 12,319,443 B2

(12) United States Patent
Aston et al.

(10) Patent No.: US 12,319,443 B2
(45) Date of Patent: Jun. 3, 2025

(54) STACKED SATELLITE ASSEMBLIES AND RELATED METHODS

(71) Applicant: The Boeing Company, Chicago, IL (US)

(72) Inventors: Richard W. Aston, Brea, CA (US); Emily Colleen Woods, Redondo Beach, CA (US); Rachel Elizabeth Zilz, Redondo Beach, CA (US); Michael John Langmack, Huntington Beach, CA (US); Nicole Marie Hastings, Hermosa Beach, CA (US)

(73) Assignee: The Boeing Company, Arlington, VA (US)

( * ) Notice: Subject to any disclaimer, the term of this patent is extended or adjusted under 35 U.S.C. 154(b) by 13 days.

(21) Appl. No.: 17/553,593

(22) Filed: Dec. 16, 2021

(65) Prior Publication Data

US 2022/0194632 A1 Jun. 23, 2022

Related U.S. Application Data

(60) Provisional application No. 63/126,529, filed on Dec. 17, 2020.

(51) Int. Cl.
*B64G 1/10* (2006.01)
*B64G 1/64* (2006.01)
*B64G 1/00* (2006.01)

(52) U.S. Cl.
CPC .............. *B64G 1/10* (2013.01); *B64G 1/641* (2013.01); *B64G 1/645* (2013.01); *B64G 1/002* (2013.01)

(58) Field of Classification Search
CPC .......... B64G 1/10; B64G 1/641; B64G 1/645; B64G 1/002; B64G 1/50; B64G 2001/643; B64G 1/005; B64G 2001/1092
See application file for complete search history.

(56) References Cited

U.S. PATENT DOCUMENTS

| 3,976,269 | A | | 8/1976 | Gupta |
| 5,280,706 | A | * | 1/1994 | Yorgason ................ B29C 53/44 220/62.19 |
| 5,342,465 | A | | 8/1994 | Bronowicki et al. |

(Continued)

FOREIGN PATENT DOCUMENTS

| CA | 3023416 A1 | 1/2019 |
| CN | 106694884 A | 5/2017 |

(Continued)

OTHER PUBLICATIONS

European Patent Office, Extended European Search Report regarding European Patent Application No. 21214774.8, dated Apr. 21, 2022, 7 pages.

(Continued)

*Primary Examiner* — Medhat Badawi
*Assistant Examiner* — Vicente Rodriguez
(74) *Attorney, Agent, or Firm* — Harrity & Harrity, LLP

(57) ABSTRACT

A satellite apparatus is disclosed, including a housing having first and second opposing walls, and a support structure inside the housing spanning the first and second walls. The support structure is structurally connected to the housing only at the first and second walls, and an end portion of the support structure is configured for connection to a launch vehicle by a separation system.

20 Claims, 10 Drawing Sheets

(56) References Cited

U.S. PATENT DOCUMENTS

| | | | |
|---|---|---|---|
| 6,064,352 A | 5/2000 | Silverman et al. | |
| 6,199,801 B1 | 3/2001 | Wilke et al. | |
| 6,206,327 B1* | 3/2001 | Benedetti | B64G 1/10 244/159.4 |
| 6,207,256 B1 | 3/2001 | Tashiro | |
| 6,290,183 B1 | 9/2001 | Johnson et al. | |
| 6,343,770 B2 | 2/2002 | Holemans | |
| 7,249,756 B1 | 7/2007 | Wilke et al. | |
| 8,393,582 B1* | 3/2013 | Kutter | B64G 1/641 244/172.3 |
| 8,458,976 B2 | 6/2013 | Chen et al. | |
| 8,550,408 B2* | 10/2013 | Ross | B64G 1/641 244/159.4 |
| 8,973,873 B2 | 3/2015 | Aston et al. | |
| 9,027,889 B2* | 5/2015 | Aston | B64G 1/402 244/173.1 |
| 9,475,594 B2 | 10/2016 | Barber et al. | |
| 9,718,566 B2 | 8/2017 | Field et al. | |
| 9,796,486 B1 | 10/2017 | Illsley et al. | |
| 9,828,117 B2 | 11/2017 | Echelman et al. | |
| 9,902,507 B2* | 2/2018 | Walker | B64G 1/402 |
| 10,392,135 B2 | 8/2019 | Smith et al. | |
| 10,407,189 B1 | 9/2019 | Freestone et al. | |
| 10,494,123 B2 | 12/2019 | Aston et al. | |
| 10,518,912 B2 | 12/2019 | Arulf et al. | |
| 10,536,107 B1 | 1/2020 | Ning et al. | |
| 10,538,347 B1* | 1/2020 | Turner | B64G 1/10 |
| 10,556,710 B2 | 2/2020 | Lancho Doncel | |
| 10,633,123 B2* | 4/2020 | Chiang | B64G 1/641 |
| 10,895,015 B1 | 1/2021 | Schaedler et al. | |
| 11,072,441 B2* | 7/2021 | Cherrette | B64G 1/64 |
| 11,858,667 B1* | 1/2024 | O'Brien | B64G 1/641 |
| 2004/0074206 A1 | 4/2004 | Tanase et al. | |
| 2006/0107611 A1 | 5/2006 | Merrifield | |
| 2006/0185277 A1 | 8/2006 | Quincieu | |
| 2011/0120080 A1 | 5/2011 | Schwark, Jr. et al. | |
| 2011/0296675 A1 | 12/2011 | Roopnarine et al. | |
| 2012/0060468 A1* | 3/2012 | Dushku | F02K 9/72 427/412.3 |
| 2012/0112010 A1 | 5/2012 | Young et al. | |
| 2012/0261515 A1 | 10/2012 | Smith et al. | |
| 2013/0000247 A1 | 1/2013 | Sypeck | |
| 2014/0041231 A1 | 2/2014 | Andrews | |
| 2014/0065433 A1 | 3/2014 | Lau et al. | |
| 2014/0131521 A1 | 5/2014 | Apland et al. | |
| 2014/0239125 A1 | 8/2014 | Aston et al. | |
| 2015/0048209 A1 | 2/2015 | Hoyt et al. | |
| 2015/0175210 A1 | 6/2015 | Raymond | |
| 2015/0298423 A1 | 10/2015 | Holemans | |
| 2016/0031572 A1 | 2/2016 | Dube | |
| 2016/0237836 A1 | 8/2016 | Harris | |
| 2016/0282067 A1 | 9/2016 | Aston et al. | |
| 2016/0288926 A1 | 10/2016 | Smith et al. | |
| 2016/0304222 A1* | 10/2016 | Fernandez | B64G 1/002 |
| 2016/0325520 A1 | 11/2016 | Berger | |
| 2016/0340061 A1 | 11/2016 | Bose et al. | |
| 2017/0036783 A1 | 2/2017 | Snyder | |
| 2017/0327252 A1 | 11/2017 | Lim et al. | |
| 2018/0106564 A1 | 4/2018 | Isaacs et al. | |
| 2018/0194096 A1 | 7/2018 | Martial Somda et al. | |
| 2018/0194494 A1 | 7/2018 | Dube | |
| 2018/0223947 A1 | 8/2018 | Shepard et al. | |
| 2018/0229443 A1 | 8/2018 | Pham et al. | |
| 2018/0251238 A1* | 9/2018 | Cherrette | H01Q 3/26 |
| 2018/0251241 A1 | 9/2018 | Burt | |
| 2018/0281339 A1 | 10/2018 | Hull et al. | |
| 2019/0023423 A1 | 1/2019 | Grubler et al. | |
| 2019/0202163 A1 | 7/2019 | Yeh et al. | |
| 2019/0315501 A1 | 10/2019 | Duong et al. | |
| 2019/0337220 A1 | 11/2019 | Beyerle et al. | |
| 2020/0010220 A1 | 1/2020 | Fraze | |
| 2021/0061495 A1 | 3/2021 | Aston et al. | |
| 2021/0221540 A1 | 7/2021 | Panetti et al. | |
| 2021/0354856 A1 | 11/2021 | Aston et al. | |
| 2021/0354859 A1 | 11/2021 | Aston et al. | |
| 2021/0356015 A1 | 11/2021 | Aston et al. | |
| 2022/0033111 A1* | 2/2022 | Welle | B64G 1/64 |

FOREIGN PATENT DOCUMENTS

| | | |
|---|---|---|
| CN | 208392799 U | 1/2019 |
| CN | 109317677 A | 2/2019 |
| CN | 111532452 A | 8/2020 |
| EP | 0780294 A1 | 6/1997 |
| EP | 3034208 A1 | 6/2016 |
| EP | 3333474 A1 | 10/2017 |
| EP | 3569396 A1 | 11/2019 |
| EP | 3785828 A1 | 3/2021 |
| JP | 2011251560 A | 12/2011 |
| WO | 2017169080 A1 | 10/2017 |
| WO | 2021081389 A1 | 4/2021 |

OTHER PUBLICATIONS

European Patent Office, Extended European Search Report regarding European Patent Application No. 21214809.2, dated Apr. 25, 2022, 9 pages.
Planetary Systems Corporation, "2000785G Mkll MLB User Manual," Jul. 24, 2018, 94 pages, Planetary Systems Corporation, Silver Spring, Maryland.
Morrett, Robert, Sep. 10, 2015, "Selecting a filler metal: Seven factors to consider", Plant Engineering https://www.plantengineering.com/articles/selecting-a-filler-metal-seven-factors-to-consider/ (Year: 2015).
U.S. Patent and Trademark Office, Final Office Action regarding U.S. Appl. No. 16/554,150, dated May 31, 2022, 19 pages.
U.S. Patent and Trademark Office, Non-Final Office Action regarding U.S. Appl. No. 16/554,150, dated Oct. 4, 2022, 27 pages.
U.S. Patent and Trademark Office, Non-Final Office Action regarding U.S. Appl. No. 17/553,628, dated Jan. 24, 2023, 47 pages.
European Patent Office, Extended European Search Report regarding European Patent Application No. 21168773.6, dated Oct. 19, 2021, 9 pages.
European Patent Office, Extended European Search Report regarding European Patent Application No. 21168768.6, dated Oct. 19, 2021, 11 pages.
U.S. Patent and Trademark Office, Non-Final Office Action regarding U.S. Appl. No. 16/877,477, dated Apr. 14, 2022, 31 pages.
U.S. Patent and Trademark Office, Non-Final Office Action regarding U.S. Appl. No. 16/877,480, dated Feb. 10, 2023, 49 pages.
U.S. Patent and Trademark Office, Final Office Action regarding U.S. Appl. No. 16/877,474, dated Mar. 15, 2023, 20 pages.
U.S. Patent and Trademark Office, Final Office Action regarding U.S. Appl. No. 16/554,150, dated Mar. 27, 2023, 19 pages.
European Patent Office, Examination Report regarding European Patent Application No. 21168768.6, dated Mar. 28, 2023, 7 pages.
Zhang, Xiaoyu et al. "Vibration tests of 3D printed satellite structure made of lattice sandwich panels." AIAA Journal 56.10 (Oct. 1, 2018): 4213-4217.
European Patent Office, Extended European Search Report regarding European Patent Application No. 20189687.5, dated Feb. 1, 2021, 11 pages.
Mauduit et al., Study of the Suitability of Aluminum Alloys for Additive Manufacturing by Laser Powder Bed Fusion, U.P.B. Sci. Bull., Series B. vol. 79, Iss. 4, 2017, 22 pages.
U.S. Patent and Trademark Office, Non-Final Office Action regarding U.S. Appl. No. 16/877,474, dated Sep. 7, 2022, 49 pages.
Canadian Intellectual Property Office, Office Action regarding Canadian Patent Application No. 3,140,350, dated Feb. 14, 2024, 4 pages.
Extended European Search Report for European Application No. EP241953298 dated Dec. 17, 2024, 10 pages.
Anonymous: "File:SOHO ready for encapsulation.jpg—Wikimedia Commons", , Nov. 9, 1995, pp. 1-4, XP093257835, Retrieved from

(56) References Cited

OTHER PUBLICATIONS the Internet: URL:https://commons.wikimedia.org/wiki/ File: SOHO_ready_for_encapsulation.jpg.

* cited by examiner

STACKED SATELLITE ASSEMBLIES AND RELATED METHODS

CROSS-REFERENCES

This application claims the benefit under 35 U.S.C. § 119(e) of the priority of U.S. Provisional Patent Application Ser. No. 63/126,529, filed Dec. 17, 2020, the entirety of which is hereby incorporated by reference for all purposes.

BACKGROUND

To offset the high cost of launch, increasing numbers of satellites are being deployed from a single launch vehicle. Smaller satellites such as microsats and CubeSats in particular are good candidates for multi-manifest launch. However, the intense and highly directional forces of launch require mounting structures and satellite designs specifically engineered to effectively transfer loads to the launch vehicle structure and to withstand conditions such as high bending or torsional loads that result from a selected mounting arrangement and orientation. Effective structural designs and arrangements are needed that maximize utilization of limited launch vehicle space and allow efficient deployment in space, while minimizing weight, production costs, and launch preparation time.

SUMMARY

The present disclosure provides systems, apparatus, and methods relating to satellite support structures and assemblies. In some examples, a satellite apparatus may include a housing having first and second opposing walls, and a support structure inside the housing spanning the first and second walls. The support structure may be structurally connected to the housing only at the first and second walls, and a proximal end portion of the support structure may be configured for connection to a launch vehicle by a separation system.

In some examples, a satellite assembly may include a launch vehicle having a launch axis and a plurality of satellites inside the launch vehicle. The plurality of satellites may be stacked perpendicular to the launch axis.

In some examples, a method of deploying satellites from a launch vehicle may include stowing a plurality of satellites inside a launch vehicle by stacking the satellites horizontally relative to a vertical launch axis. The method may further include carrying the satellites to space in the launch vehicle, and separating the satellites from the launch vehicle horizontally relative to the vertical launch axis.

Features, functions, and advantages may be achieved independently in various examples of the present disclosure, or may be combined in yet other examples, further details of which can be seen with reference to the following description and drawings.

DETAILED DESCRIPTION

Figure 1:
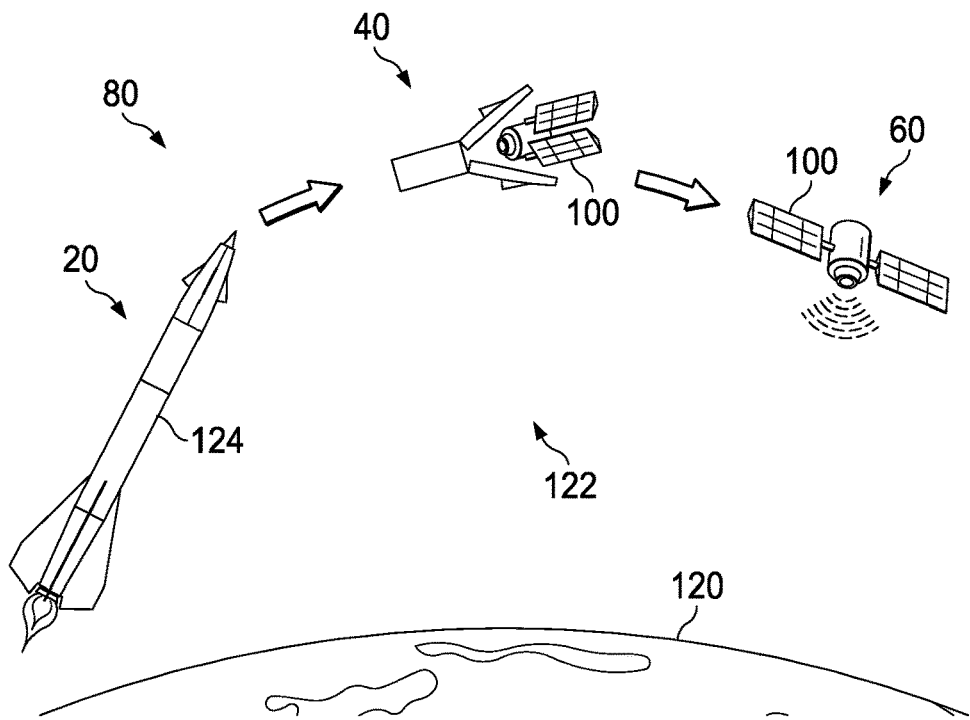
FIG. 1 is schematic diagram of an illustrative satellite being launched and deployed from a launch vehicle.

Various aspects and examples of a satellite having a cylindrical support structure, as well as related stacked satellite assemblies and methods, are described below and illustrated in the associated drawings. Unless otherwise specified, a satellite and/or satellite assembly in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, a satellite in accordance with the present teachings may include a hollow central support structure and a housing. The central support structure may be the primary structure of the satellite, supporting the housing and connecting to a launch vehicle. The central support structure may span between first and second panels of the housing, and may be connected to the housing only by the first and second panels. Payload and operational equipment of the satellite may be supported by the housing. The central support structure may be additively manufactured, and include a cylindrical wall having an array of diamond-shaped apertures. For launch, the satellite may form part of a structural satellite launch configuration.

In general, a structural satellite launch configuration in accordance with the present teachings may include two satellites, each satellite having a central support structure that is the primary structure of the satellite. The central support structures of the two satellites may be connected to form a single beam structure, which may be mounted as a cantilever beam to a payload adaptor of a launch vehicle. In other words, the central support structures of the two satellites may define a core axis and the satellites may be mounted in the launch vehicle such that the core axis is perpendicular to a launch axis of the launch vehicle.

In some examples, a structural satellite launch configuration may include a plurality a pairs of connected satellites. Each pair of connected satellites may be connected to a central ring payload adaptor of the launch vehicle, extending radially outward from the ring adaptor. In some examples, a structural satellite launch configuration may include one or more stacks of three or more satellites having connected central support structures, the one or more stacks being mounted to the launch vehicle such that a core axis defined by the central support structures is perpendicular to the launch axis of the launch vehicle.

Examples, Components, and Alternatives

The following sections describe selected aspects of exemplary satellites as well as related assemblies and/or methods. The examples in these sections are intended for illustration and should not be interpreted as limiting the entire scope of the present disclosure. Each section may include one or more distinct examples, and/or contextual or related information, function, and/or structure.

A. Illustrative Satellite and Associated Method

Figure 2:
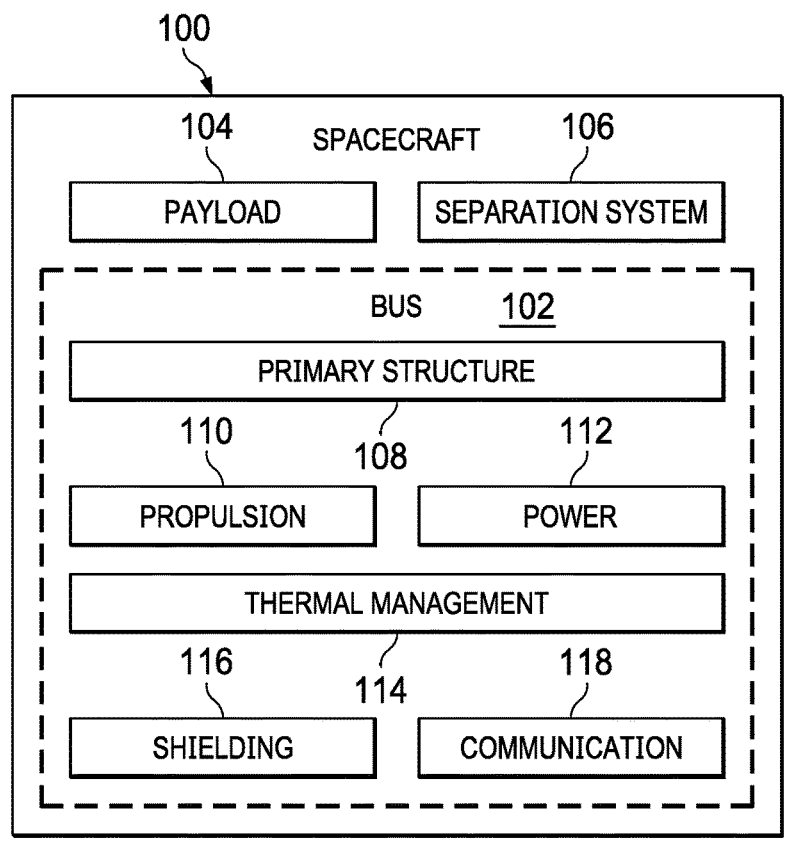
FIG. 2 is a block diagram of the satellite of FIG. 1.

Examples disclosed herein may be described in the context of an illustrative satellite launch method 80 (see FIG. 1) and an illustrative satellite 100 (see FIG. 2). In the present example, method 80 includes three phases: a launch phase 20, a separation or deployment phase 40, and an operation phase 60. Launch phase 20 may include transporting satellite 100 (alternatively, spacecraft 100) from a planetary body 120 such as Earth to outer space 122, using a launch vehicle 124. In the context of Earth, outer space may comprise a region beyond the Karman line. Deployment phase 40 may include separating satellite 100 from launch vehicle 124 once a desired location, trajectory and/or orbit has been achieved. Operation phase 60 may include preparation of satellite 100 for operation, such as establishing communication with a controller on planetary body 120, extending solar panels or instrument arms, and/or maneuvering to a desired orientation relative to the planetary body. In some examples, the method may further include design, production, and/or in-service phases.

Each of the processes of method 80 may be performed or carried out by a system integrator, a third party, and/or an operator (e.g., a customer). For the purposes of this description, a system integrator may include, without limitation, any number of aerospace manufacturers and major-system subcontractors; a third party may include, without limitation, any number of vendors, subcontractors, and suppliers; and an operator may be a telecommunications company, leasing company, military entity, service organization, and so on.

As shown in FIG. 2, satellite 100 may include a bus 102 with a plurality of satellite systems, a payload 104 and a separation system 106. Examples of the plurality of systems include one or more of a primary structure 108, a propulsion system 110, an electrical power system 112, a thermal management system 114, a radiation shielding system 116, and a communication system 118. Each system may comprise various subsystems, such as controllers, processors, actuators, effectors, motors, generators, etc., depending on the functionality involved. Any number of other systems may be included. Although an unmanned artificial satellite example is shown, the principles disclosed herein may be applied to other aerospace vehicles and technology, such as a launch vehicle, space station, crewed spacecraft, and/or interstellar probe.

Apparatuses and methods shown or described herein may be employed during any one or more of the stages of the satellite launch method 80. For example, two or more satellites may be stacked perpendicular to a launch axis of launch vehicle 124 during launch phase 20. Similarly, one or more examples of the apparatus or method realizations, or a combination thereof, may be utilized, for example and without limitation, while satellite 100 and/or launch vehicle 124 are in preparation prior to execution of launch method 80. Also, one or more examples of the apparatuses, methods, or combinations thereof may be utilized during deployment phase 40 for example, by deploying a satellite radially outward from launch vehicle 124, perpendicular to the launch axis of the vehicle.

B. Illustrative Satellite Assembly

As shown in FIGS. 3-6, this section describes an illustrative satellite assembly 200. Satellite assembly 200 is an example of a structural satellite launch configuration, as described above. The assembly includes a plurality of satellite stacks 210. Each stack 210 includes a proximal satellite 212 and a distal satellite 214, and is connected to a payload adaptor 216 by a mounting plate 218. In some examples, a stack may include three or more satellites.

Figure 3:
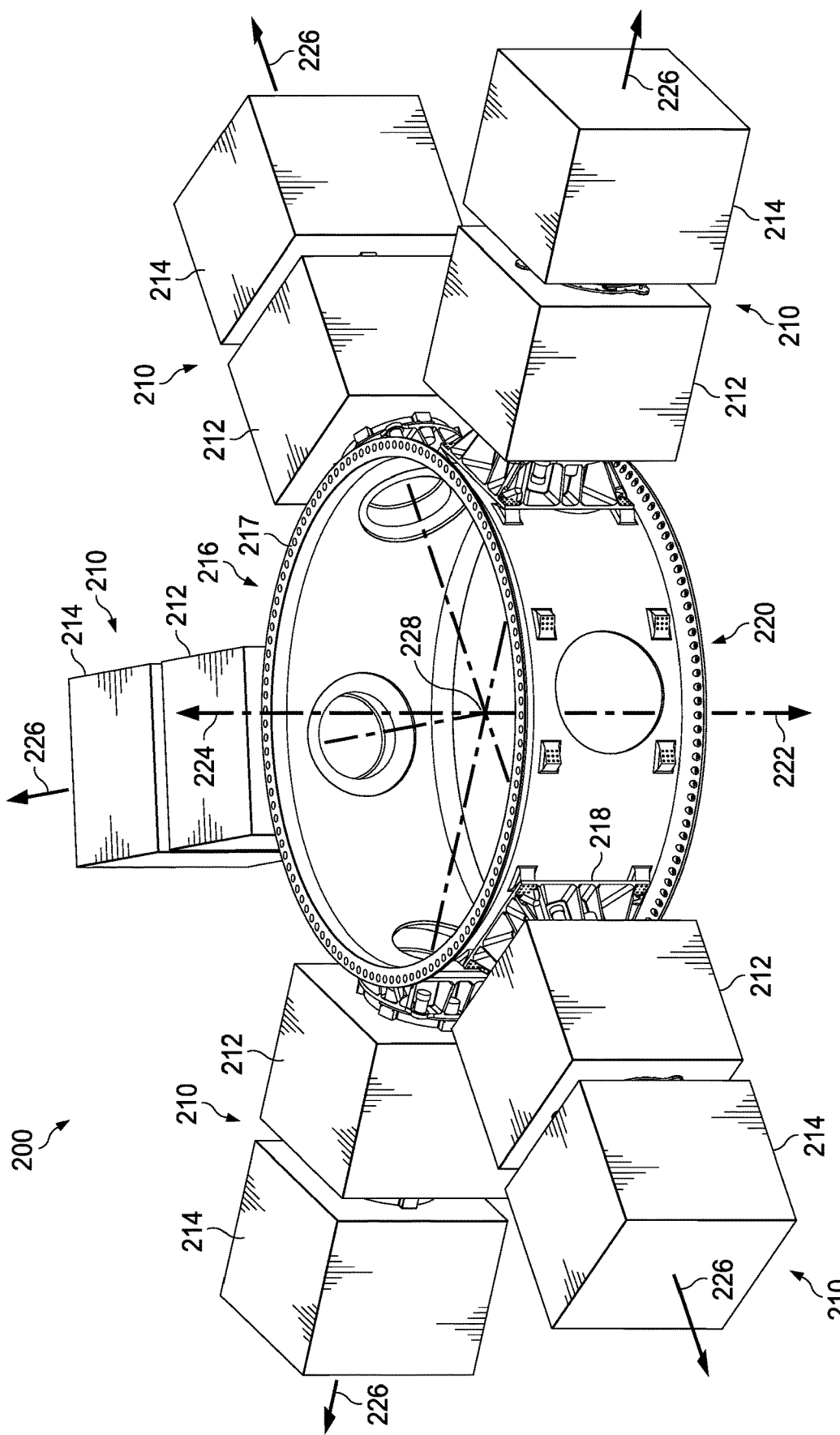
FIG. 3 is an isometric view of a plurality of illustrative satellite stacks in accordance with aspects of the present disclosure mounted to a launch vehicle payload adaptor in accordance with aspects of the present disclosure.

In the example depicted in FIG. 3, payload adaptor 216 includes a ring structure 217 such as the Evolved Secondary Payload Adapter (ESPA) produced by Moog, Inc. The plurality of satellite stacks 210 are connected to ring structure 217 at six mounting points 220, arranged symmetrically around the ring structure. In FIG. 3, one of satellite stacks 210 is not depicted, in order to show the corresponding mounting point 220. In general, the plurality of satellite stacks may be arranged symmetrically about payload adaptor 216 in order to balance loads transferred to the payload adaptor.

Payload adaptor 216 is part of a launch vehicle, having a launch axis 222. The launch axis may also be described as a longitudinal axis of the launch vehicle, as a z-axis, or as a vertical axis. Directions perpendicular to the launch axis may be described as lateral and/or horizontal.

Prior to launch, the launch axis may be aligned with a vertical direction as defined by a gravitational frame of reference. During launch, the launch axis may rotate relative to the gravitational frame of reference as the vehicle follows a non-linear launch trajectory. Therefore, for clarity in the following description, directional terms and descriptors such as "up", "down", "top", "bottom", and the like should be understood relative to the launch axis.

In the present example, ring structure 217 of payload adaptor 216 has a central axis 224 parallel to launch axis 222. Each of satellite stacks 210 has a core axis 226, which may also be described as a longitudinal or central axis of the stack. Core axis 226 of each satellite stack 210 extends through a center point 228 of ring structure 217, on central axis 224 of the ring structure. That is, the core axes of the plurality of satellite stacks intersect at the center point of the ring structure.

The plurality of satellite stacks 210 may be described as horizontal stacks, branches, projection assemblies, and/or radially connected satellite groups. Each satellite stack 210 extends radially out from ring structure 217, perpendicular to central axis 224 of the ring structure. That is, core axis 226 of each satellite stack is perpendicular to launch axis 222.

Proximal satellite 212 of each satellite stack is releasably connected to the corresponding mounting plate 218 by a separation system and/or device as discussed further below. Each distal satellite 214 is similarly releasably connected to the corresponding proximal satellite by a separation system and/or device. Each mounting plate 218 is fixedly attached to one of mounting points 220 of ring structure 217. In the present example, the mounting plate is bolted to the ring structure. In some examples, the mounting plate may be an integral part of payload adaptor 216 and/or the proximal satellite may connect directly to the mounting point. In some examples, mounting plate 218 may support other additional payload or launch vehicle components, and/or may form part of another structure.

Figure 6:
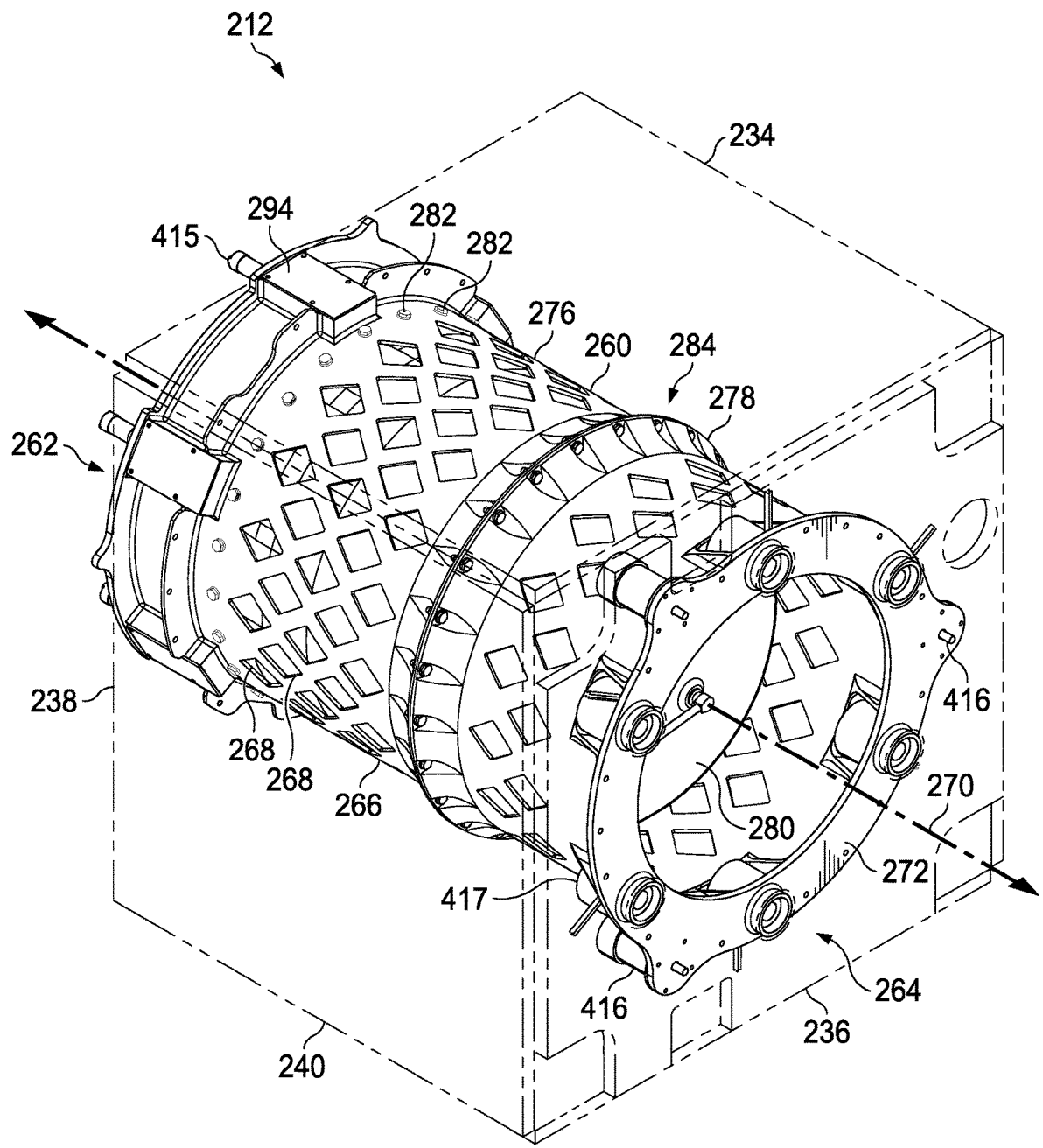
FIG. 6 is an isometric front view of the core structure, fuel tank, and housing panels of the satellite of FIG. 4, with the panels depicted as transparent.
Figure 7:
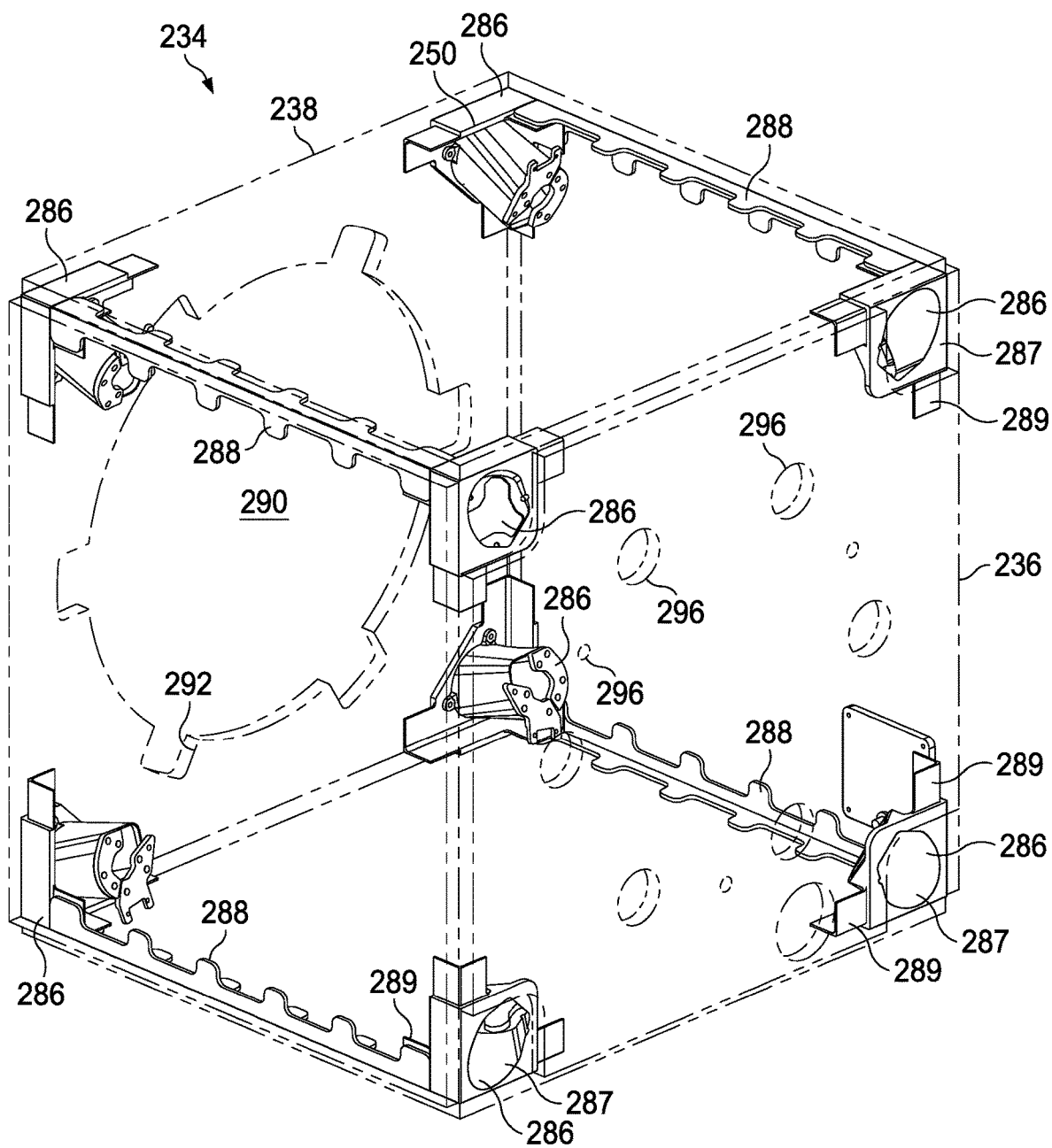
FIG. 7 is an isometric view of the housing of the satellite of FIG. 4, with the panels depicted as transparent.
Figure 8:
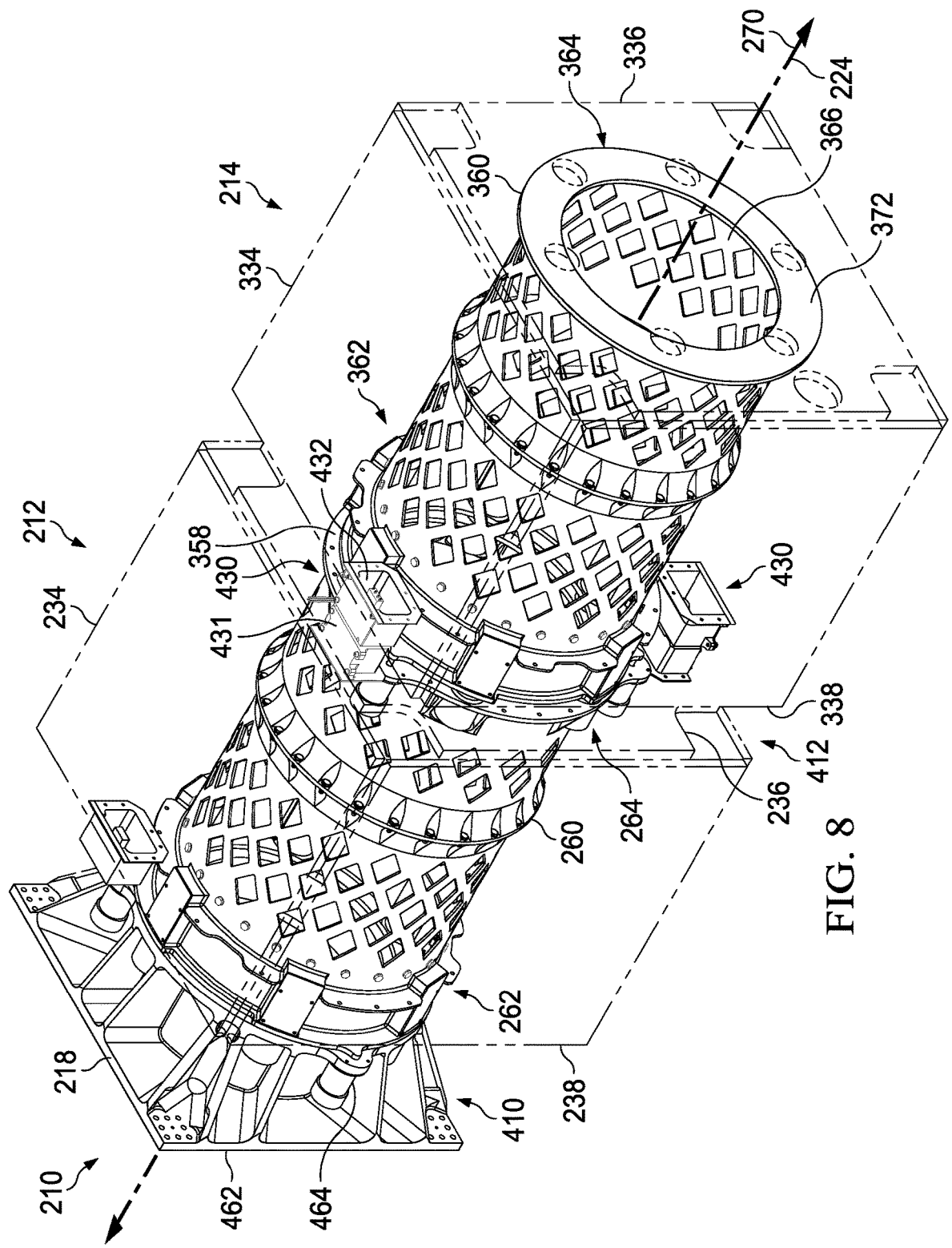
FIG. 8 is an isometric view of an illustrative satellite stack, including the core structure of proximal satellite of FIG. 4 connected to the core structure of a distal satellite and a mounting plate, with the housing panels of the satellites depicted as transparent.
Figure 9:
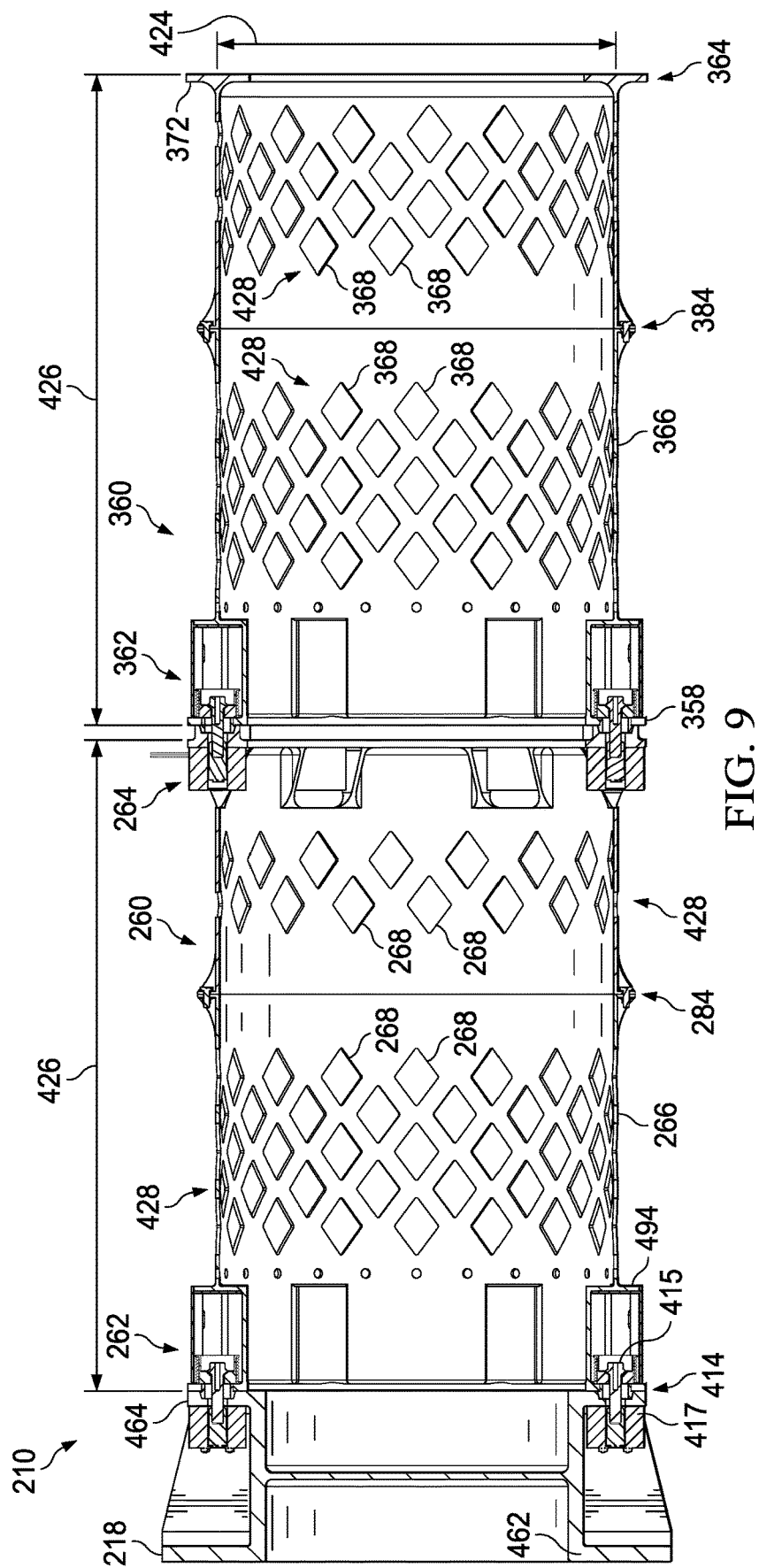
FIG. 9 is a cross-sectional view of the mounting plate and core structures of FIG. 8.
Figure 10:
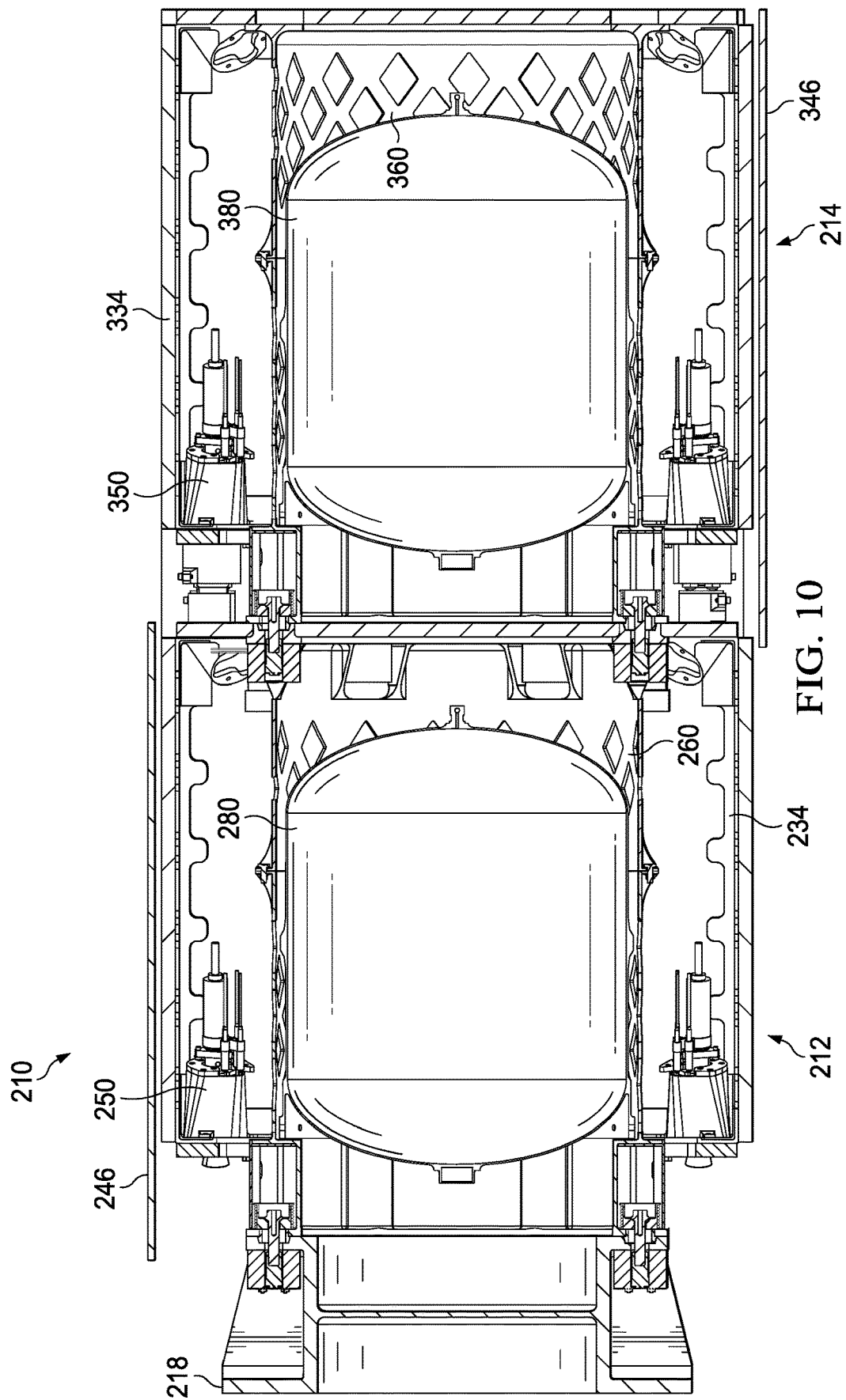
FIG. 10 is a cross-sectional view of the satellite stack of FIG. 8, including the core structures, housings, and propulsion systems.

FIGS. 8-10 depict one satellite stack 210, and FIGS. 4-7 depict proximal satellite 212 of that satellite stack. Descriptions thereof may be understood to apply equally to each of satellite stacks 210, except where stated otherwise. In general, satellites of a satellite assembly as described herein may include a primary structure as described below, but may vary in payload, housing design and specifications of operational systems such as communications, shielding, and thermal regulation.

Figure 4:
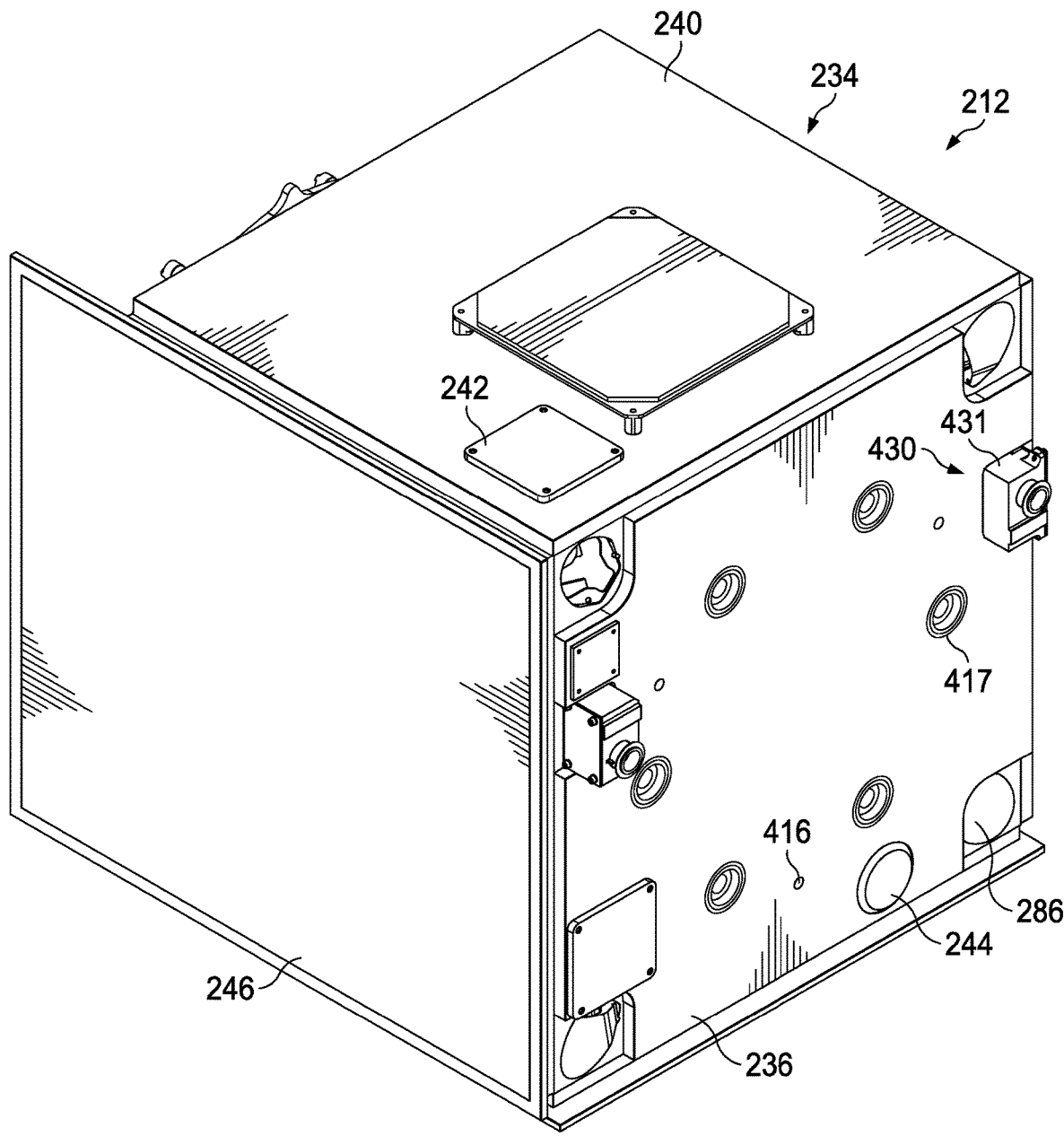
FIG. 4 is an isometric front view of a proximal satellite of the satellite assembly of FIG. 3.
Figure 5:
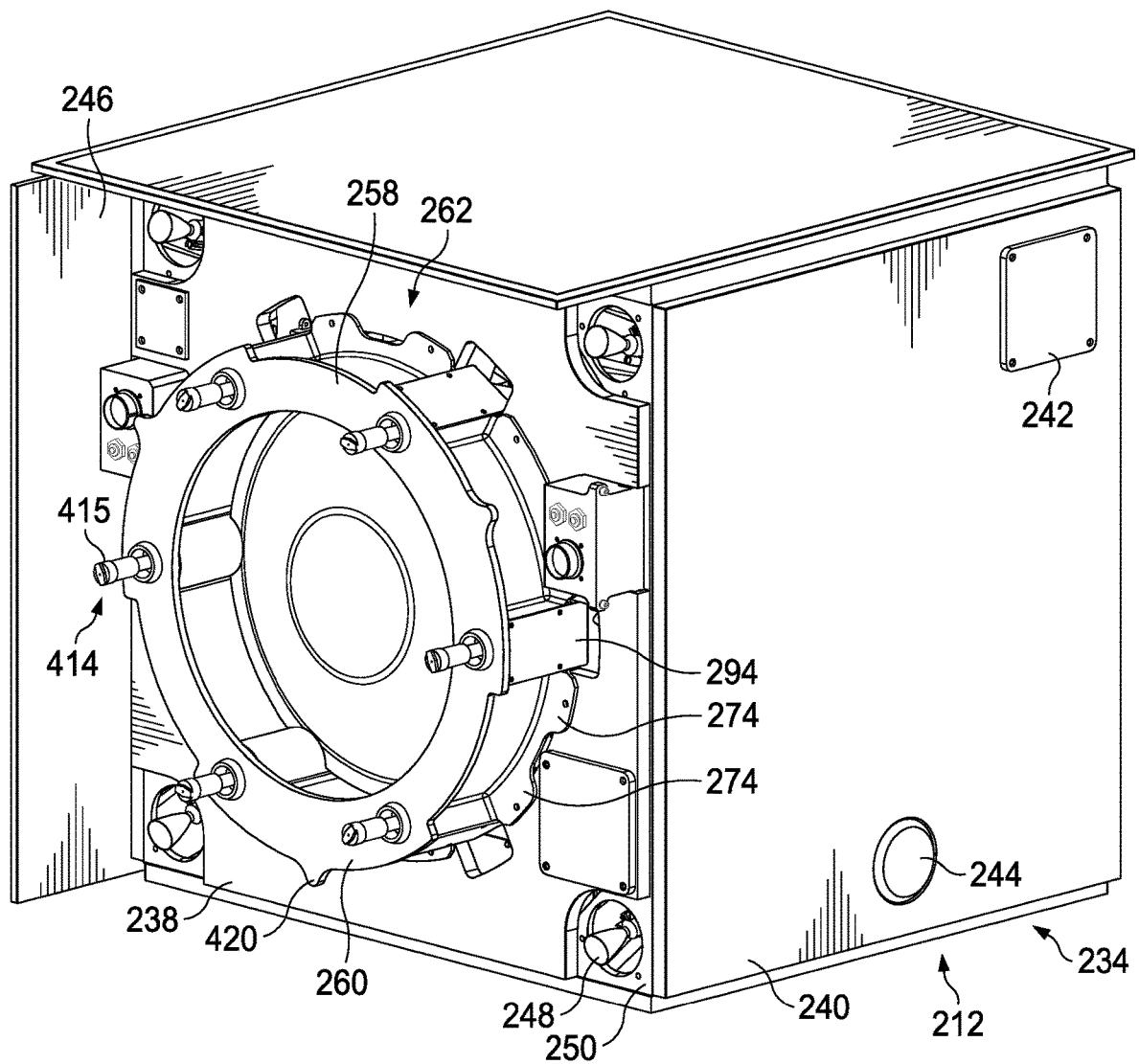
FIG. 5 is an isometric rear view of the satellite of FIG. 4.

FIGS. 4 and 5 are opposite isometric views of proximal satellite 212. FIG. 4 depicts a distal side of the satellite and FIG. 5 a proximal side of the satellite, in the context of the satellite's orientation relative to the payload adaptor. In the present example, proximal satellite 212 is roughly cuboid, and includes a housing 234 of six planar and square or rectangular wall panels. More specifically, the satellite includes a fore panel 236 and an opposing aft panel 238. Four equipment panels 240 span between the fore and aft panels. Proximal satellite 212 further includes a plurality of patch antennas 242, mast baffles 244, and a solar array 246 comprised of two deployable panels. Four thrusters 248 are mounted in brackets 250 at the four corners of aft panel 238. Satellite 212 may further include any appropriate operational or payload equipment, including but not limited to a fuel tank, star tracker, reaction wheel, heat sinks, radiator panels, and/or avionics. A majority of equipment may be mounted to interior surfaces of equipment panels 240.

Also shown in FIG. 5 is a proximal end portion 262 of a cylindrical core structure 260 of proximal satellite 212, which extends out through aft panel 238. Core structure 260 can be seen more entirely in FIG. 6, where housing 234 is depicted as transparent. The core structure may also be described as a support structure, hollow column, and/or central beam.

Core structure 260 is a hollow cylinder, spanning between aft panel 238 and fore panel 236 and enclosed in housing 234. The core structure may also be described as a hollow column. The core structure defines a central axis 270 and is centered in proximal satellite 212. Proximal end portion 262 is fixed to aft panel 238 and a distal end portion 264 of the core structure is fixed to fore panel 236. A wall 266 including a plurality of apertures 268 extends between the two end portions. Wall 266 is thin relative to the diameter of the core structure, allowing the core structure to be strong and stiff but light. Apertures 268 may further lighten the core structure, without sacrificing desired structural properties.

Core structure 260 acts at the primary structure of the satellite, and is configured to structurally connect the satellite to both the launch vehicle and a distal satellite. More specifically, proximal end portion 262 is configured for connection to the launch vehicle payload adaptor through a mounting plate and distal end portion 264 is configured for connection to the core structure of another satellite. Each end portion of core structure 260 is configured for connection by a separation system or device. In the present example, both end portions are configured for connection by similar separation systems, as described further below. In some examples, the proximal and distal end portions may be configured for connection by different separation system or devices.

Distal end portion 264 includes an interface flange 272 which contacts an interior surface of fore panel 236. In the present example, the core structure is fixed to the fore panel by a plurality of fasteners extending through apertures in interface flange 272 and into the fore panel. Proximal end portion 262 includes a plurality of interface tabs around the circumference of wall 266, extending out from the wall and contacting an exterior surface of aft panel 238. In the present example, the core structure is fixed to the aft panel by a plurality of fasteners extending through apertures in interface tabs 274 into the aft panel.

As shown in FIG. 6, proximal satellite 212 includes a fuel tank 280 mounted inside core structure 260. Such placement may help to maximize space efficiency in the satellite, allowing core structure 260 to have a large cross-section for improved strength and stiffness, without wasting interior space. Apertures 268 may facilitate necessary access and/or connections to the tank such as fluid connections to fill valves or electrical connections to sensors.

An outer diameter of tank 280 may be close to, but less than an inner diameter of wall 266 of core structure 260. To allow the closely-fitting tank to be positioned inside core structure 260, the core structure includes two parts which can be assembled around tank 280. More specifically, core structure 260 comprises a first section 276 and a second section 278.

First section 276 includes proximal portion 262, second section 278 includes distal portion 264, and the first and second sections are bolted together at an intermediate interface 284. Intermediate interface 284 may be described as disposed part-way along the extent of wall 266. Each of the first and second sections are thickened proximate intermediate interface 284, to reinforce and strengthen the connection and allow the two sections to act as a single effective structural support of satellite 212.

In the present example, wall 266 further includes apertures for a plurality of shim bolts 282 to center and precisely position tank 280 in the core structure. In general, core structure 260 may include any customizations or modifications appropriate to installation, support, or integration of operational equipment of proximal satellite 212.

FIG. 7 is an isometric view of housing 234 of proximal satellite 212, with panels 236, 238, 240 depicted as transparent. In the present example, the panels of the housing are connected by eight corner brackets 286 and four angle clips 288. Corner brackets 286 include the four thruster brackets 250, and are each positioned inside a corner of housing 234, where a corner of either fore panel 236 or aft panel 238 meets corners of two equipment panels 240. Angle clips 288 each extend along the inside of an edge of housing 234, where edges of two equipment panels 240 meet.

A main body 287 of each corner bracket 286 is positioned at a corresponding corner cut-out of fore panel 236 or aft panel 238. Sides of main portion 287 of the corner bracket contact interior surfaces of the three adjacent panels, and may be bonded or otherwise fixed to the panels. Corner bracket 286 further includes angle tabs 289, configured to contact an inner surface of angle clips 288. For each corner bracket 286, one angle tab 289 may be bonded or otherwise fixed to an adjacent angle clip 288. Each angle clip 288 may therefore be fixed to, and extend between, a first corner bracket at aft panel 238 and a second corner bracket at fore panel 236.

Angle clips 288 and corner brackets 286 may structurally connect equipment panels 240 to fore panel 236 and aft panel 238, which in turn are structurally connected to the core structure of the satellite. Equipment panels 240 are not directly connected to the core structure. In other words, the core structure is only connected to equipment panels 240 through the fore and aft panels. Loads from equipment mounted to equipment panels 240 may be transferred through fore panel 236 and aft panel 238 to the core structure.

Housing 234 does not form part of the primary structure of proximal satellite 212. As shown in FIGS. 8-10, core structure 260 of proximal satellite 212 connects directly to mounting plate 218 and the core structure of the distal satellite. Core structure 260 is the primary structure of proximal satellite 212, and the primary load path to the launch vehicle.

Housing 234 surrounds and encloses the core structure and satellite equipment. The housing is supported by core structure 260, and not directly connected to the launch vehicle. As a result, freedom of material choice and design for housing 234 is significantly increased.

As shown in FIG. 7 and described above, in the present example housing 234 is roughly cuboid and composed of planar panels. In general, the housing may have any shape appropriate to house satellite systems and equipment and efficiently stow inside the launch vehicle. For example, the housing may be a polyhedron, may include curved panels, and/or may have an irregular shape. Preferably, housing 234 may be generally symmetric about central axis 270 and/or balanced for straightforward and tumble-free separation during deployment.

In the present example, panels 236, 238, 240 comprise a composite honeycomb sandwich material. In general, the panels may include any light-weight material or materials that are sufficiently strong to support mounted equipment. For example, the panels may be additively manufactured and/or include additively manufactured portions that may be produced by three-dimensional (3D) printing, laser sintering of a metal alloy, or other method. The panels need not be designed for the strength or stiffness required of a primary structure.

Housing 234 may be highly customizable to selected payload and operational satellite equipment. View ports, supports, shielding, access holes, or other modifications may be made to the housing without affecting the primary structure of the satellite. Particularly in combination with the rapid prototyping and design implementation capabilities of additively manufactured components, such freedom may significantly simplify design and reduce testing and certification times.

Of housing 234, fore panel 236 and aft panel 238 may have the most design constraints. That is, the two panels or structures of housing 234 connected to the proximal and distal ends of the core structure may need to be configured to interface with the core structure. In the present example, the core structure interfaces with the fore and aft panels as defined by the position and direction of the satellite thrusters. In some examples, the core structure may connect to sides of the satellite such that the satellite may be described as mounted sideways to the launch vehicle, or may be mounted to any two opposing walls or wall portions of the housing.

Referring again to FIG. 7, aft panel 238 includes a circular aperture 290 with six circumferential cutouts or recesses 292. Circular aperture 290 and recesses 292 may allow core structure 260 to protrude through aft panel 238, such that proximal end portion 262 is exterior to the aft panel as shown in FIG. 5. More specifically, wall 266 may extend through circular aperture 290 and six bays 294 protruding out from wall 266 may extend through recesses 292. In other words, aft panel 238 may include an aperture shaped to correspond to core structure 260, such that proximal end portion 262 can extend through the aft panel. The specific shape of proximal end portion 262 and the aperture in aft panel 238 may depend on the separation system selected, as described further below.

As shown in FIGS. 4 and 7, fore panel 236 includes six large and three small circular apertures 296, positioned to allow devices of the separation system to extend through the panel to engage distal end portion 264 of core structure 260. Similarly to aft panel 238, fore panel 236 may include any aperture or apertures shaped and positioned to match the selected separation system and corresponding configuration of distal end portion 264.

FIG. 8 depicts proximal satellite 212 connected to distal satellite 214 and mounting plate 218, as part of a satellite stack 210. Similarly to proximal satellite 212, distal satellite 214 includes a roughly cuboid housing 334 and a cylindrical core structure 360 with a proximal end portion 362 and a distal end portion 364. Core structure 360 spans between a fore panel 336 and an aft panel 338, with proximal end portion 362 extending out through the aft panel to connect to distal end portion 264 of proximal satellite 214.

In the present example, distal satellite 214 is generally identical to proximal satellite 212 apart from the configuration of distal end portion 364 of core structure 360. Accordingly, reference numerals for components of distal satellite 214 match those of corresponding components of proximal satellite 212. In general, distal satellite 214 may include a core structure 360 generally matching and configured to connect to core structure 260 of proximal satellite 212, but may otherwise differ in design from proximal satellite 212. For example, payloads, operational equipment, and/or housings of the two satellites may differ.

Distal end portion 364 of distal satellite 214 is more simply configured than distal end portion 264 of proximal satellite 212, as shown more clearly in FIG. 9. Unlike distal end portion 264, distal end portion 364 does not need to be configured for connection to another core structure, in the present example. Therefore distal end portion 364 includes cylindrical wall 366 up to a circular, annular interface flange 372 for connection to the fore panel of distal satellite 214. This simpler shape may be desirably lighter. In some examples, distal end portion 364 of distal satellite 214 may match distal end portion 264 of proximal satellite 212 for simplicity of manufacture and/or satellite design. In some examples, satellite stack 210 may include three or more satellites, at least one of which may include a core configured for connection to an adjacent satellite at both proximal and distal ends.

In the present example, distal satellite 214 connects to proximal satellite 212 in the same manner as the proximal satellite connects to mounting plate 218. Accordingly, proximal end portion 362 of core structure 360 of distal satellite 214 matches proximal end portion 262 of core structure 260 of proximal satellite 212. Mounting plate 218 also includes a distal portion 464 which matches distal portion 264 of proximal satellite 212.

Mounting plate 218 may act as an adaptor, facilitating structural connection between core structure 260 of proximal satellite 212 and the launch vehicle payload adaptor. The mounting plate includes a proximal portion 462 configured for connection to a mounting point of the payload adaptor. In the present example, proximal portion 462 includes a square, planar face with bolt holes at each corner. Proximal portion 462 and distal portion 464 are joined by a cylindrical center wall with supporting braces. In general, mounting plate 218 may have any geometry or configuration appropriate to provide a strong connection and efficient load path between the core structures of the satellites and the launch vehicle.

Together, mounting plate 218, core structure 260, and core structure 360 may act as a cantilever beam extending horizontally outward from the launch vehicle payload adaptor. The combined core structure is sufficiently stiff to support both proximal satellite 212 and distal satellite 214, withstanding the bending moment and vibrational loading associated with launch. The joined core structures also provide a strong and simple load path to the launch vehicle. As described further below, the dimensions and design of the core structures provide the needed stiffness, with minimal weight.

Also important to the stiffness of the beam effected by the combined core structures, is the stiffness of the connections between core structure 260 and core structure 360, and between core structure 260 and mounting plate 218. Any effective separation system or device may be used to connect the satellites. However, a system providing direct connection between the core structures, such as is depicted in the present example, may be preferable to provide a sufficiently stiff connection.

Satellite stack 210 includes a proximal separation system 410 connecting proximal satellite 212 and mounting plate 218, and a distal separation system 412 connecting distal satellite 214 and proximal satellite 212. As shown most clearly in FIGS. 4-6, each separation system 410, 412 includes six separable connectors 414 and three push-off pins 416. Each separable connector 414 comprises a male portion 415 and a female portion 417.

On proximal satellite 212, male portions 415 of separable connectors 414 of separation system 410 are housed in bays 294 of proximal end portion 262 and extend out through an interface flange 258 of the proximal end portion to engage a corresponding female portion on the mounting plate. Female portions 417 of separable connectors 414 of separation system 412 are mounted in recesses in wall 266 of distal end portion 264, on an opposite side of interface flange 272 from fore panel 236. Corresponding apertures in interface flange 272 allow the respective male portions on the distal satellite to reach through the flange to female portions 417.

Push-off pins 416 of separation system 412 are mounted similarly to female portions 417 of the separation system. That is, the push-off pins are mounted on the opposite side of interface flange 272 from fore panel 236, and extend through corresponding apertures in the interface flange and fore panel to contact an interface flange of the proximal portion of distal satellite 214. Interface flange 258 of proximal end portion 262 of proximal satellite 212 includes three scallops 420 to engage the push-off pins on mounting plate 218.

Separable connectors 414 and push-off pins 416 of separation systems 410, 412 are spaced evenly around the circumference of core structures 260, 360. Each device 414, 416 of the separation systems is spring actuated for smooth and reliable separation, and connected to a control system for coordinated triggering.

As shown in FIGS. 9-10, devices 414, 416 of separation system 410 are not interposed between mounting plate 218 and core structure 260. Similarly the devices of separation system 412 are not interposed between core structure 260 and core structure 360. Interface flange 258 of proximal end portion 262 of core structure 260 contacts mounting plate 218 directly. Interface flange 272 of distal end portion 264 of core structure 260 and interface flange 358 of proximal end portion 362 of core structure 360 contact the inner and exterior faces of fore panel 236 of proximal satellite respectively, with only the fore panel between the two flanges. The direct connection between core structures may result in the desired stiffness. Devices of the separation systems may also be individually configured to facilitate a stiff connection.

In the present example, separation system 412 further includes two separable housing connectors 430, shown in FIGS. 8 and 10. Each housing connector 430 includes a first bracket 431 mounted to fore panel 236 of proximal satellite 212 and a second bracket mounted to aft panel 338 of distal satellite 214. The first and second brackets 431, 432 are connected by a spring-actuated releasable mechanism similar to separable connectors 414. Together the two connected brackets 431, 432 have an axial extent matching proximal end portion 362 of the distal satellite, allowing housing connectors 430 to bridge between the two satellites when core structure 260 is connected to core structure 360.

Housing connectors 430 may be configured and/or positioned according to the geometry or other properties of housings 234 and 334. In the present example, the two housing connectors are positioned at opposing outer lateral edges of the satellites to provide additional lateral stability to the connection between the satellites, and assist in tumble-free separation.

FIG. 9 is a cross-sectional view of the primary structure of satellite stack 210, including mounting plate 218, separation system 410, core structure 260, separation system 412, and core structure 360. Each core structure has an inner diameter 424 as defined by an interior surface of wall 266 or 366. Each core structure 260, 360 also has a length 426 from the interface flange at the proximal end to the interface flange at the distal end. Inner diameter 424 and length 426 are the same for core structure 260 and core structure 360.

In the present example, the core structures have an inner diameter 424 of approximately 12 inches and a length of approximately 20 inches. Walls 266, 366 of the core structures have a thickness of between approximately 100 and 200 thousandths of an inch. The core structures, and the cantilever beam structure formed by connecting the core structures, are strong and stiff enough to support proximal and distal satellites of approximately 100 kilograms each, at a vibration frequency of approximately 30 hertz. In general, core structures 260, 360 may be any size appropriate to a satellite's size and weight. That is, the core structure design may be applicable from microsats up through full-sized satellites.

Apertures 268 in wall 266 and apertures 368 in wall 366 may help to reduce the weight of the core structures, without sacrificing structural strength. In the present example, each core structure includes two arrays of apertures 428, with a first array in the first section and a second array in the second section. In some examples, the apertures may be arranged in additional arrays, and in examples such as a unitary core structure the apertures may form a single array.

Each of apertures 268, 368 is diamond shaped. In the present example, each aperture is approximately two inches in length and spaced approximately one quarter inch from adjacent apertures. Arrays of apertures 428 may also be described as a mesh and/or as a diamond lattice. The diamond shape may be particularly suited to additive manufacture. Any desired aperture shape may be used, and an appropriate aperture shape may depend on a selected method of manufacture. Aperture size and spacing may be selected according to desired structural properties and/or electromagnetic properties of the core structure.

In the present example, core structures 260, 360 are additively manufactured from metal. More specifically, the core structures may comprise laser sintered metal alloy, manufactured using direct metal laser sintering (DMLS) of an aluminum alloy. In general, the core structures may be manufactured according to any effective method and of any sufficiently strong and light material. Additive manufacture of the core structures may be particularly suited to production of the thin walls, apertures, and customized interface features.

Other components of satellites 212, 214 may be advantageously manufactured using additive manufacturing methods such as DMLS or electron beam melting (EBM). For example, fuel tank 280, angle clips 288, corner brackets 286, and/or panels 236, 238, 240 may be additively manufactured.

C. Illustrative Method

Figure 11:
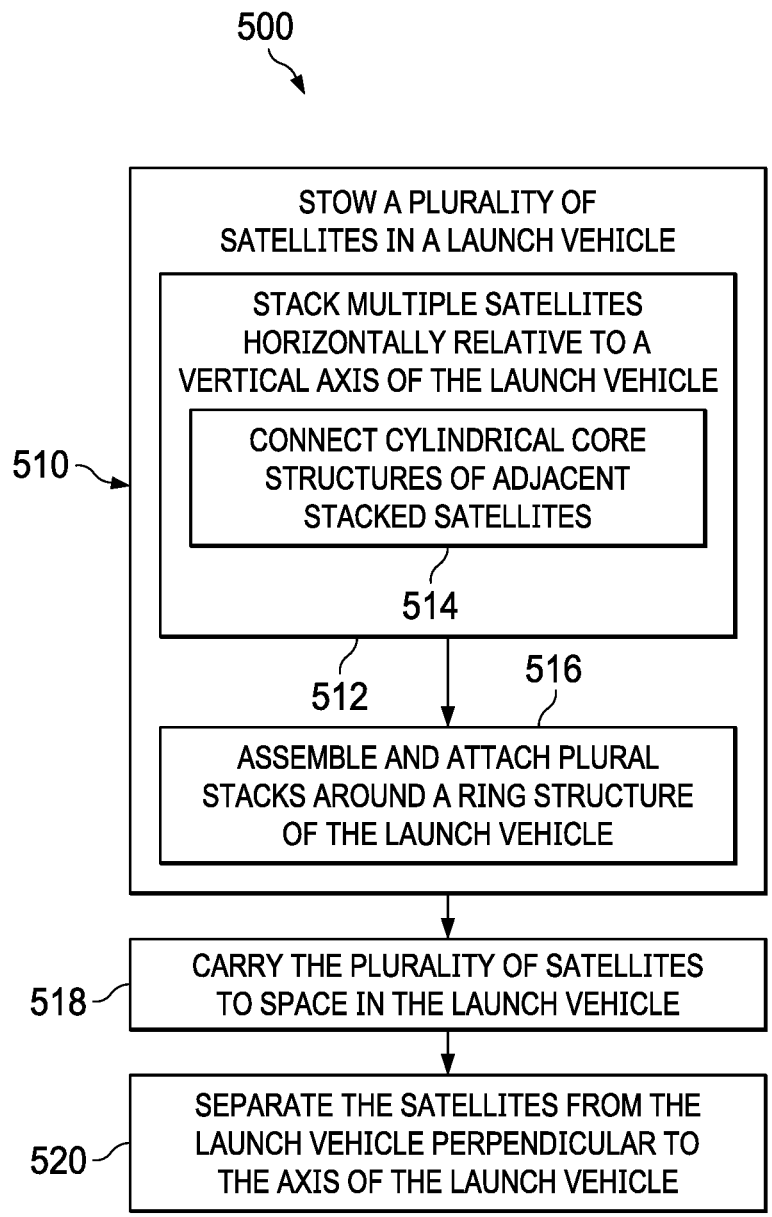
FIG. 11 is a is a flow chart depicting steps of an illustrative method of deploying satellites from a launch vehicle, according to the present teachings.

This section describes steps of an illustrative method of deploying satellites from a launch vehicle; see FIG. 11. Aspects of satellites, structural satellite launch configurations, and/or launch vehicle payload adaptors and mounting plates described above may be utilized in the method steps described below. Where appropriate, reference may be made to components and systems that may be used in carrying out each step. These references are for illustration, and are not intended to limit the possible ways of carrying out any particular step of the method.

FIG. 11 is a flowchart illustrating steps performed in an illustrative method, and may not recite the complete process or all steps of the method. Although various steps of method 500 are described below and depicted in FIG. 11, the steps need not necessarily all be performed, and in some cases may be performed simultaneously or in a different order than the order shown.

At step 510, the method includes stowing a plurality of satellites in a launch vehicle. The launch vehicle may comprise any vehicle suitable to transport a payload to space. For example, the launch vehicle may be an expendable autonomous vehicle, or may be a manned spacecraft. Step 510 may be performed as part of preparations for launch of the vehicle, and the plurality of satellites may be configured for connection to and launch in the vehicle. Stowing the satellites may include attaching the satellites to a payload adaptor of the launch vehicle and/or to one another using one or more separation systems and/or devices. The satellites may be stowed according to sub-steps 512-516 of step 510.

Sub-step 512 includes stacking multiple satellites horizontally relative to a vertical axis of the launch vehicle. In other words, two or more satellites may be positioned adjacent one another along a horizontal axis. The vertical axis may correspond to an orientation of the launch vehicle during preparations for launch and/or may correspond to a launch direction or launch axis. The vertical axis may also be referred to as a primary axis of the launch vehicle. The two or more satellites may be referred to as a horizontal stack and/or lateral assembly. Only one of the satellites of the stack may be directly connected to the launch vehicle.

Sub-step 514 of sub-step 512 includes connecting cylindrical core structures of adjacent satellites of the stacked satellites. A primary structure of each satellite of the plurality of satellites may include a cylindrical core structure. Each core structure may have the same diameter, and may be configured for connection to another core structure by a separation system. Within the horizontal stack of satellites, each satellite may be connected to the adjacent satellites by the core structure. The connected core structures of the satellites of the stack may form a beam, extending horizontally out from the launch vehicle payload adaptor.

Sub-step 516 of step 510 includes assembling and attaching plural stacks around a ring structure of the launch vehicle. The ring structure may be the payload adaptor of the launch vehicle, and may include a plurality of attachment or mount points. A plurality of horizontal stacks may be assembled according to sub-step 512, and one satellite of each stack may be connected to a mount point of the ring structure. The horizontal stacks of satellites and/or the horizontal axis of each stack may extend radially outward from the ring.

Step 518 includes carrying the plurality of satellites to space in the launch vehicle. Step 518 and/or method 500 may include finalizing launch preparations for the vehicle and/or the satellites. For example, the method may include connecting control systems and separation systems, enclosing the satellites in thermal protection, and/or stowing additional payloads. Step 518 may include launching the vehicle, and propelling the vehicle into space with rockets.

Space may be understood to include any region or location desirable for deployment of one or more of the carried plurality of satellites. For example, space may include, but is not limited to, a region beyond the Karman line of Earth, a region outside the atmosphere of a planetary body, or an orbit around a non-planetary body.

Step 520 includes separating the satellites from the launch vehicle, perpendicular to the launch vehicle axis. Separating the satellites may be performed sequentially, and may be performed by actuating in turn the separation systems that connect adjacent satellites and the separation systems that connect the stacks of satellites to the ring structure of the launch vehicle.

The separation systems may be disposed between adjacent satellites, and/or otherwise configured to provide a separating impulse in a direction parallel to the axis along which the satellites are stacked. In other words, each separation system may be actuated to urge a satellite away from the launch vehicle in a direction perpendicular to the primary axis of the launch vehicle, and/or in a direction radially outward from the ring structure.

Illustrative Combinations and Additional Examples

This section describes additional aspects and features of satellites and stack assemblies, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A first satellite apparatus, comprising:
a housing including first and second opposing walls, and
a support structure spanning the first and second opposing walls and enclosed by the housing,
wherein a proximal end portion of the support structure is configured for connection to a launch vehicle by a separation system.

A1. The apparatus of A1, wherein the support structure has a core axis passing through a center point of the separation system when the housing is connected to the launch vehicle.

A2. The apparatus of A1 or A0, wherein the support structure is cylindrical.

A3. The apparatus of any of A0-A2, wherein the support structure is a hollow column.

A4. The apparatus of any of A0-A3, wherein the support structure is comprised of laser sintered metal alloy.

A5. The first apparatus of any of A0-A4, wherein the support structure includes a wall portion having diamond shaped apertures.

A6. The apparatus of any of A0-A5, wherein a distal end portion of the support structure is configured for connection to another satellite by a separation system.

A7. The apparatus of any of A0-A6, wherein the housing further includes a plurality of equipment panels.

A8. The apparatus of any of A0-A7, further comprising:
a second satellite apparatus comprising:
a housing including first and second opposing walls, and
a support structure spanning the first and second opposing walls and enclosed by the housing,
wherein a distal end portion of the support structure in the first satellite is connected to a proximal end portion of the support structure in the second satellite.

A9. The apparatus of A8, wherein the support structures of the first and second satellite apparatus share a common central axis when connected.

A10. The apparatus of A8 or A9, wherein the support structures of the first and second satellite apparatus are each cylindrical, and have the same diameter.

A11. The apparatus of any of A8-A10, wherein the distal end portion of the support structure in the first satellite is connected to the proximal end portion of the support structure in the second satellite by a separation system.

A12. The apparatus of any of A8-A11, wherein the second wall of the first satellite is connected to the first wall of the second satellite by a separation system.

B0. A satellite assembly, comprising:
a launch vehicle having a launch axis, and
a plurality of satellites inside the launch vehicle, stacked perpendicular to the launch axis.

B1. The satellite assembly of B0, wherein each of the plurality of satellites has an internal cylindrical core structure, the internal cylindrical core structures being aligned along a common core axis.

B2. The satellite assembly of B1, wherein the cylindrical core structure is additively manufactured.

B3. The satellite assembly of B1 or B2, wherein the cylindrical core has a wall portion including diamond shaped apertures.

B4. The satellite assembly of any of B0-B3, wherein the plurality of satellites are secured in a plurality of satellite stacks equally distributed around a circumference of a ring structure.

B5. The satellite assembly of B4, wherein the ring structure has a center point, each of the satellites including a cylindrical core structure aligned along a core axis passing through the center point of the ring structure.

B6. The satellite assembly of any of B0-B5, wherein the satellites are connected to the launch vehicle by a separation system.

B7. The satellite assembly of any of B0-B6, wherein each satellite is connected to an adjacent stacked satellite by a separation system.

C0. A method of deploying satellites from a launch vehicle, comprising:
stowing a plurality of satellites inside a launch vehicle by stacking the satellites horizontally relative to a vertical launch axis,
carrying the satellites to space in the launch vehicle, and
separating the satellites from the launch vehicle horizontally relative to the vertical launch axis.

C1. The method of C0, wherein the separating step includes:
sequentially separating adjacent satellites from the launch vehicle.

C2. The method of C0 or C1, wherein each satellite has a cylindrical core structure, the stowing step including:
connecting the cylindrical core structures of adjacent satellites.

C3. The method of any of C0-C2, wherein the stacking step includes:
assembling plural stacks of satellites evenly distributed around a ring structure.

D0. A satellite supporting structure, comprising:
a plurality of hollow cylindrical structures stacked end to end and connected by one or more separation systems, configured to support a stack of satellites perpendicular to a launch direction.

D1. The satellite supporting structure of D0, further comprising:
a ring structure connected to an end portion of one of the cylindrical structures.

D2. The satellite supporting structure of D1, wherein the cylindrical structures form a cantilever beam extending from the ring structure perpendicular to a long axis of a launch vehicle.

D3. The satellite supporting structure of any of D0-D2, wherein each of the cylindrical structures includes a wall portion having diamond shaped apertures.

D4. The satellite supporting structure of any of D0-D3, wherein each cylindrical structure is additively manufactured.

D5. The satellite supporting structure of any of D0-D4, wherein each cylindrical structure is comprised of laser sintered metal alloy.

D6. The satellite supporting structure of any of D0-D5, wherein each cylindrical structure is contained inside a satellite housing.

Advantages, Features, and Benefits

The different examples of the satellites and satellite assemblies described herein provide several advantages over known solutions for designing and mounting satellites for launch. For example, illustrative examples described herein allow a sturdy and simple satellite structural design.

Additionally, and among other benefits, illustrative examples described herein provide a stiff and lightweight primary structure.

Additionally, and among other benefits, illustrative examples described herein allow a satellite primary structure to be rapidly and inexpensively produced by additive manufacture.

Additionally, and among other benefits, illustrative examples described herein allow a strong and simple load path for stacked satellites.

Additionally, and among other benefits, illustrative examples described herein remove the primary structural function limitations from the satellite housing.

No known system or device can perform these functions, particularly in a horizontal configuration. Thus, the illustrative examples described herein are particularly useful for efficient utilization of secondary payload space in a launch vehicle. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A first satellite apparatus, comprising:
a housing including an opposing fore wall and aft wall and four side walls spanning between the fore wall and aft wall, and
a support structure spanning the fore wall and aft wall and enclosed by the four side walls of the housing, the support structure having a distal end portion that is affixed to the fore wall and a proximal end portion that protrudes through the aft wall,
wherein the proximal end portion of the support structure includes a first interface flange and a first portion of a separation system for connection to a launch vehicle through a second portion of the separation system mounted to the launch vehicle, and
wherein each of the four side walls is connected to the support structure only through the fore wall and aft wall.

2. The apparatus of claim 1, wherein the support structure is a hollow column.

3. The apparatus of claim 2, wherein the support structure is cylindrical.

4. The apparatus of claim 1, wherein the support structure is comprised of laser sintered metal alloy.

5. The apparatus of claim 1, wherein the support structure includes a wall portion having diamond shaped apertures.

6. The apparatus of claim 1, further comprising:
a second satellite apparatus comprising:
a housing including first and second opposing walls, and
a support structure spanning the first and second opposing walls and enclosed by the housing,
wherein a distal end portion of the support structure in the first satellite apparatus is connected to a proximal end portion of the support structure in the second satellite apparatus.

7. The apparatus of claim 6, wherein loads transfer from the second satellite apparatus to the launch vehicle through the support structure of the first satellite apparatus.

8. The apparatus of claim 6, wherein the support structure of the first satellite apparatus and the support structure of the second satellite apparatus share a common central axis when connected.

9. The apparatus of claim 6, wherein the support structure of the first satellite apparatus is connected to the support structure of the second satellite apparatus by another separation system.

10. A satellite assembly, comprising:
a launch vehicle having a launch axis, and
a plurality of satellite stacks inside the launch vehicle, each satellite stack including a proximal satellite and a distal satellite,
wherein each satellite, of the plurality of satellite stacks, has an internal cylindrical core structure, and the internal cylindrical core structures of the proximal satellite and the distal satellite of each satellite stack are aligned along a common core axis perpendicular to the launch axis, and
wherein the distal satellite of each stack is connected only to the proximal satellite of the stack, and loads transfer from the distal satellite to the launch vehicle through the internal cylindrical core structure of the proximal satellite of the satellite stack.

11. The satellite assembly of claim 10, wherein the plurality of satellite stacks are equally distributed around a circumference of a ring structure.

12. The satellite assembly of claim 11, wherein the ring structure has a center point, and the core axis of each satellite stack passes through the center point of the ring structure.

13. The satellite assembly of claim 10, wherein each distal satellite is connected to a corresponding proximal satellite by a separation system.

14. A method of deploying satellites from a launch vehicle, comprising:
stacking a plurality of satellites inside the launch vehicle by aligning the satellites along a stack axis that is horizontal relative to a vertical launch axis,
connecting each satellite of the plurality of satellites to one or more satellites that are adjacent along the stack axis, wherein each two connected satellites are connected by one of a plurality of separation systems,
connecting a first satellite of the plurality of satellites directly to the launch vehicle by one of the plurality of separation systems,
carrying the plurality of satellites to space in the launch vehicle, and
sequentially separating the plurality of satellites, by using each separation system of the plurality of separation systems to urge either a distal one of the respective two connected satellites or the first satellite away from the launch vehicle in a horizontal direction relative to the vertical launch axis.

15. The method of claim 14, wherein each satellite has a cylindrical core structure, and stacking the plurality of satellites includes:
connecting the cylindrical core structures of adjacent satellites.

16. The method of claim 14, wherein stacking the plurality of satellites includes:

assembling plural stacks of satellites evenly distributed around a ring structure, each stack of satellites being aligned along a respective stack axis that is horizontal relative to the vertical launch axis.

17. The satellite assembly of claim 10, wherein the internal cylindrical core structures of the proximal satellite and the distal satellite of a respective satellite stack are connected to form a cantilever beam, extending horizontally out from a payload adaptor of the launch vehicle.

18. The satellite assembly of claim 10, wherein loads transfer from the distal satellite of each satellite stack to the launch vehicle only through the internal cylindrical core structure of the proximal satellite of the satellite stack, a first separation system connecting the internal cylindrical core structure of the proximal satellite to the launch vehicle, and a second separation system connecting the internal cylindrical core structure of the distal satellite to the internal cylindrical core structure of the proximal satellite.

19. The satellite assembly of claim 10, wherein the internal cylindrical core structure of the proximal satellite is connected to the internal cylindrical core structure of the distal satellite by a separation system such that the separation system is not interposed between the internal cylindrical core structure of the proximal satellite and the internal cylindrical core structure of the distal satellite.

20. The method of claim 14, wherein each satellite of the plurality of satellites apart from the first satellite is connected only to the one or more satellites that are adjacent along the stack axis.

* * * * *